United States Patent
Park et al.

(10) Patent No.: US 9,804,327 B1
(45) Date of Patent: Oct. 31, 2017

(54) PHASE ERROR COMPENSATING APPARATUS

(71) Applicant: Electronics and Telecommunications Research Institute, Daejeon (KR)

(72) Inventors: Heuk Park, Daejeon (KR); Sae Kyoung Kang, Daejeon (KR); Hwan Seok Chung, Daejeon (KR)

(73) Assignee: ELECTRONICS AND TELECOMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/466,405

(22) Filed: Mar. 22, 2017

(30) Foreign Application Priority Data

Apr. 8, 2016 (KR) .................. 10-2016-0043580

(51) Int. Cl.
*G02B 6/12* (2006.01)
*G02B 27/00* (2006.01)
*H04J 14/02* (2006.01)

(52) U.S. Cl.
CPC ...... *G02B 6/12011* (2013.01); *G02B 6/12016* (2013.01); *G02B 27/0012* (2013.01); *H04J 14/02* (2013.01)

(58) Field of Classification Search
CPC ............ G02B 6/12011; G02B 6/12016; G02B 27/0012; H04J 14/02
USPC ......................................................... 385/14
See application file for complete search history.

(56) References Cited

U.S. PATENT DOCUMENTS

| | | | |
|---|---|---|---|
| 5,136,671 A * | 8/1992 | Dragone ............... | G02B 6/124 385/17 |
| 6,094,513 A | 7/2000 | Rigny et al. | |
| 2002/0176665 A1 | 11/2002 | Missey et al. | |
| 2004/0202419 A1 | 10/2004 | Ho et al. | |
| 2011/0002583 A1 | 1/2011 | Kwon et al. | |
| 2014/0169729 A1 | 6/2014 | Park et al. | |

FOREIGN PATENT DOCUMENTS

JP 2013-200575 A 10/2013

OTHER PUBLICATIONS

Yamada, Hiroaki, et al. "Crosstalk Reduction in a 10-Ghz Spacing Arrayed-Waveguide Grating by Phase-Error Compensation." *Journal of Lightwave Technology* 16.3 (1998): 364-371. (8 pages, in English).

* cited by examiner

*Primary Examiner* — Jerry Blevins
(74) *Attorney, Agent, or Firm* — NSIP Law

(57) ABSTRACT

Provided is a phase error compensating apparatus. The phase error compensating apparatus may include a waveguide array disposed between a first free propagation region and a second free propagation region and configured to allow a light signal passed through the first free propagation region to move toward the second free propagation region, in which a length of each of the waveguides included in the waveguide array may be adjusted to compensate for a phase error of light signals passed through the waveguides.

6 Claims, 6 Drawing Sheets

PHASE ERROR COMPENSATING APPARATUS

CROSS-REFERENCE TO RELATED APPLICATION(S)

This application claims the priority benefit of Korean Patent Application No. 10-2016-0043580 filed on Apr. 8, 2016, in the Korean Intellectual Property Office, the disclosure of which is incorporated herein by reference for all purposes.

BACKGROUND

1. Field

One or more example embodiments relate to an optical communication device, and more particularly, to an arrayed waveguide grating (AWG).

2. Description of Related Art

In optical communications, wavelength-division multiplexing (WDM) is a transmission method that may allocate a plurality of signals to different wavelength bands, and simultaneously transmit the signals through a single optical fiber. An arrayed waveguide grating (AWG) may be necessary for the WDM, and include an arrayed waveguides (also referred to as a waveguide array herein) including a plurality of waveguides having different lengths each. The AWG may distribute a light signal to each of the waveguides based on each wavelength, and may multiplex or demultiplex the light signal using a difference among light paths based on the different lengths of the waveguides.

A loss and a crosstalk may occur due to a phase error while a plurality of light signals is passing through the waveguides. The phase error of the light signals passing through the AWG may occur due to, for example, a distortion of a radiation pattern at an input port of the AWG, a distortion occurring in a boundary between the waveguide array and a free propagation region, and a distortion occurring due to an interference among the waveguides included in the waveguide array. To correct such a phase error, a method of eliminating the aforementioned causes while maintaining a difference in length among the waveguides is used.

SUMMARY

An aspect provides a phase error compensating apparatus that may compensate for a phase error despite a cause of the phase error not being eliminated.

According to an aspect, there is provided a phase error compensating apparatus including an input waveguide corresponding to an input port to which a light signal is to be input, an output waveguide corresponding to an output port from which a light signal is to be output, a first free propagation region in which the light signal input through the input waveguide is to be propagated, a second free propagation region in which a light signal is to be propagated toward the output waveguide, and a waveguide array disposed between the first free propagation region and the second free propagation region, and configured to allow the light signal passed through the first free propagation region to move toward the second free propagation region. A length of each of the waveguides included in the waveguide array may be adjusted to compensate for a phase error of light signals passed through the waveguides.

The waveguide array may include a straight portion in which the waveguides included in the waveguide array are formed to be straight and a circular arc-shaped portion in which the waveguides included in the waveguide array are formed to be in a circular arc shape.

A length of the straight portion may be adjusted based on a central angle of the circular arc-shaped portion.

A radius of the circular arc-shaped portion may be adjusted based on the central angle of the circular arc-shaped portion and the length of the straight portion.

A length of a waveguide included in the waveguide array may be adjusted based on a phase error of a light signal passed through the waveguide, a center wavelength of the light signal of the AWG, and an effective refractive index of the waveguide.

A length of each of the waveguides included in the waveguide array may be adjusted based on a phase of a waveguide corresponding to a light signal having a greatest phase error among the light signals passed through the waveguides.

According to example embodiments, a phase error may be compensated for despite a cause of the phase error not being eliminated.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein.

Figure 1:
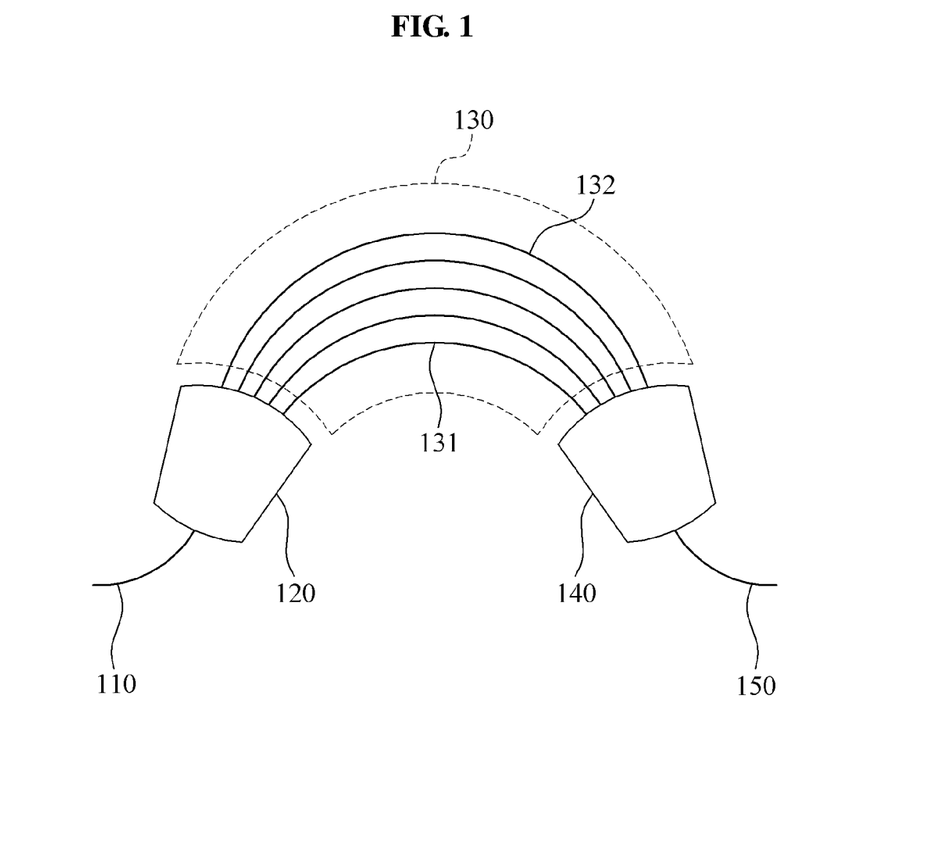
FIG. 1 is a diagram illustrating a structure of a phase error compensating apparatus according to an example embodiment.

FIG. 1 is a diagram illustrating a structure of a phase error compensating apparatus according to an example embodiment. Referring to FIG. 1, the phase error compensating apparatus includes an input waveguide 110, a first free propagation region 120, a waveguide array 130, a second free propagation region 140, and an output waveguide 150. The input waveguide 110 may correspond to an input port to which a light signal is to be input. The output waveguide 150 may correspond to an output port from which a light signal is to be output.

The waveguide array 130, which indicates arrayed waveguides, may include a plurality of waveguides. The waveguides may have different lengths. The waveguides may be arranged to be a circular arc of a fan shape, having a same center. Here, when a distance from a waveguide to a center increases, a length of the waveguide may gradually increase.

For example, as illustrated in FIG. 1, a waveguide 131 may have a shortest length among the waveguides included in the waveguide array 130 because the waveguide 131 is located closest to the center of the fan shape. Similarly, a waveguide 132 may have a longest length among the waveguides included in the waveguide array 130 because the waveguide 132 is located on an outermost side of the waveguide array 130. Thus, respective lengths of the waveguides may be different from one another.

The waveguides included in the waveguide array 130, the input waveguide 110, and the output waveguide 150 may be an element configured to transmit a light signal using total internal reflection of light. Here, a waveguide may include a polymer, glass, lithium niobate ($LiNbO_3$) or lithium tantalate ($LiTaO_3$), and silicon (Si).

The phase error compensating apparatus includes the first free propagation region 120 in which a light signal to be input through the input waveguide 110 is to be propagated, and the second free propagation region 140 in which the light signal passed through the waveguide array 130 is propagated toward the output waveguide 150. That is, the light signal input through the input waveguide 110 may be freely propagated in the first free propagation region 120, and the light signal passed through the waveguide array 130 may be freely propagated in the second free propagation region 140.

A form of a boundary between the first free propagation region 120 and the waveguide array 130 may be identical to a circumference of a fan shape with a center being at a point at which the input waveguide 110 meets the first free propagation region 120. In such a case, respective light signals to be transferred to the waveguides included in the waveguide array 130 may generally have the same phase. In addition, a form of a boundary between the second free propagation region 140 and the waveguide array 130 may be identical to a circumference of a fan shape with a center being the output waveguide 150. In such a case, a phase difference among the light signals passed through the waveguides included in the waveguide array 130 may be maintained in the second free propagation region 140.

Although each of the input waveguide 110 and the output waveguide 150 is illustrated as a single waveguide in FIG. 1, the input waveguide 110 or the output waveguide 150 of the phase error compensating apparatus may include a plurality of waveguides.

As described above, the lengths of the waveguides included in the waveguide array 130 may different from one another. For example, under the assumption that a plurality of output waveguides is connected to different portions of the second free propagation region 140, when the waveguides transmit light signals with different wavelengths, the light signals may form images in different portions of the second free propagation region 140 based on the wavelengths. Thus, the light signals with the different wavelengths may reach the output waveguides, respectively.

Thus, the phase error compensating apparatus may demultiplex a light signal including the light signals with the different wavelengths. The phase error compensating apparatus may multiplex the light signals having the different wavelengths onto a single light signal.

In principle, phases of the light signals output from the waveguides included in the waveguide array 130 may need to have a same designed value. However, the phases of the light signals may be distorted during the light signals passing through the first free propagation region 120 and the waveguide array 130, and thus a phase error may occur. The phase error may indicate how a phase of a light signal is distorted while the light signal is passing through the first free propagation region 120 and the waveguide array 130. Thus, a light signal reaching the output waveguide 150 may have a phase that is different from the designed value due to the phase error. The phase error may be different among the waveguides included in the waveguide array 130.

The phase error may occur due to various reasons. For example, a radiation pattern may be distorted while a light signal is being propagated in the first free propagation region 120, and thus a phase error may occur. For another example, a phase error may occur while a light signal propagated in the first free propagation region 120 is passing through the boundary between the first free propagation region 120 and the waveguide array 130. For still another example, a phase error may occur due to interference among the waveguides included in the waveguide array 130.

Such a phase error may result in a loss of a light signal to be output to the output waveguide 150. When the output waveguide 150 of the phase error compensating apparatus includes a plurality of waveguides, the phase error may result in interference among the waveguides, and a crosstalk among light signals output from the phase error compensating apparatus.

According to an example embodiment, a length of each of the waveguides included in the waveguide array 130 of the phase error compensating apparatus may be adjusted, and thus the phase error may be compensated for. Thus, the phase error compensating apparatus may compensate for the phase error even when the reasons or causes of the phase error described in the foregoing are not eliminated. The phase error compensating apparatus may reduce the loss of the light signal to be output through the output waveguide 150, and also the crosstalk.

Figure 2:
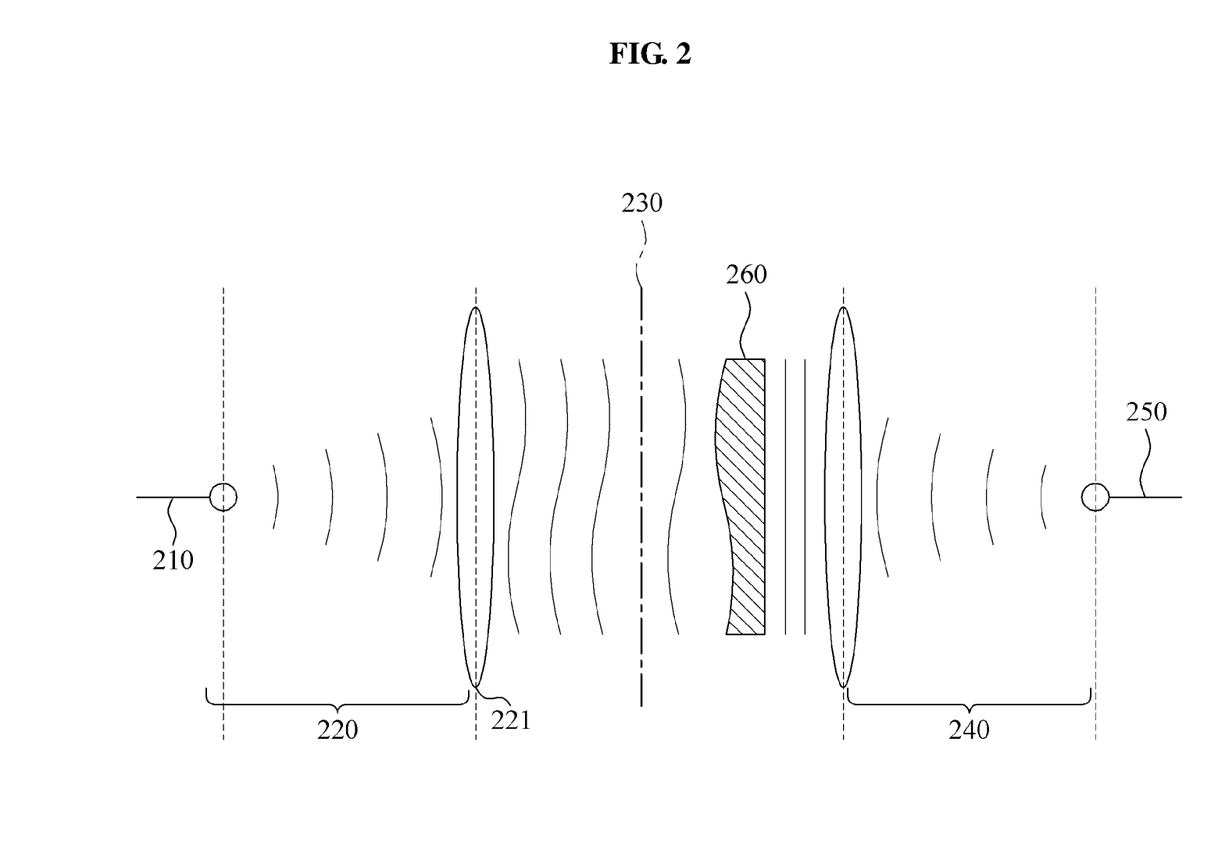
FIG. 2 is a conceptual diagram illustrating a phase error compensating apparatus according to an example embodiment.

FIG. 2 is a conceptual diagram illustrating a phase error compensating apparatus according to an example embodiment. The phase error compensating apparatus will be described in more detail with reference to FIG. 2.

Referring to FIG. 2, an input port 210 corresponds to the input waveguide 110 of FIG. 1, a first free propagation region 220 corresponds to the first free propagation region 120 of FIG. 1, a grating 230 corresponds to the waveguide array 130 of FIG. 1, a second free propagation region 240 corresponds to the second free propagation region 140 of FIG. 1, and an output port 250 corresponds to the output waveguide 150 of FIG. 1.

A light signal input through the input port 210 may be propagated in the first free propagation region 220. A lens 221 of FIG. 2 corresponds to the boundary between the first free propagation region 120 and the waveguide array 130 of FIG. 1. As described above, a form of the boundary may be identical to a circumference of the light signal being propagated in the first free propagation region 120, and thus phases of light signals passed through the lens 221 may need to be identical to one another.

A light signal passed through the grating 230 may proceed toward the second free propagation region 240. Light signals passing through the second free propagation region 240 may form an image on the output port 250. A phase of a light signal is illustrated in a form of a wavefront in FIG. 2. A phase of a light signal may be distorted while the light signal is passing through the first free propagation region 220 or the lens 221. A phase error that may occur due to the distortion of the phase may distort the image to be formed on the output port 250, which may result in a loss of the light signal and a crosstalk among light signals having different wavelengths.

According to an example embodiment, a length of each of a plurality of waveguides included in a waveguide array of the phase error compensating apparatus may be adjusted based on a phase error. In FIG. 2, the adjusted length of each of the waveguides is conceptually illustrated as a compensator 260. The compensator 260 may compensate for a phase based on a wavefront when a light signal proceeds to the second free propagation region 240 from the output port 250. Thus, a form of a wavefront of a phase of a light signal passed through the compensator 260 may correspond to a form of the wavefront of the light signal when the light signal proceeds to the second free propagation region 240 from the output port 250. That is, a phase error may be compensated for through the compensator 260 of the phase error compensating apparatus.

Figure 3A:
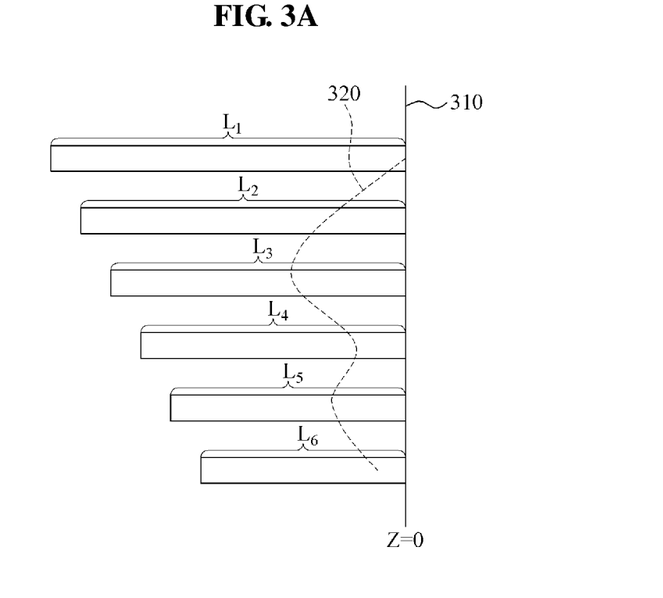
FIGS. 3A and 3B are diagrams illustrating a phase error prior to adjustment of a length of each waveguide included in a waveguide array of a phase error compensating apparatus according to an example embodiment.
Figure 3B:
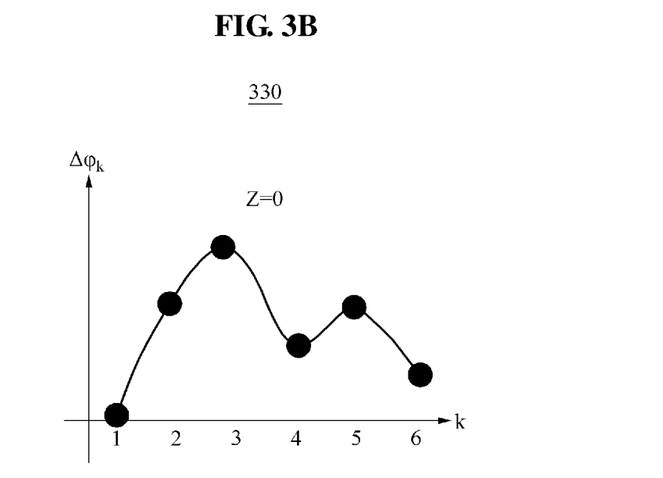

FIGS. 3A and 3B are diagrams illustrating a phase error prior to adjustment of a length of each waveguide included in a waveguide array of a phase error compensating apparatus according to an example embodiment. Hereinafter, it is assumed that the waveguide array of the phase error compensating apparatus includes a total of six waveguides, and a difference in length among the waveguides is consistent as ΔL.

Referring to FIG. 3A, a z axis 310 located at a point at which z is 0 (z=0) indicates an end portion of the waveguide array. That is, the z axis 310 corresponds to a boundary between the waveguide array and a second free propagation region. In addition, under the assumption, when a length of a k-th waveguide is L(k) (or $L_k$ as illustrated in FIG. 3), L(k+1)−L(k)=ΔL.

As described above, six light signals passed through the six waveguides, respectively, may have a phase error, and phases of the six light signals may be different from one another on the z axis 310. A phase front 320 is a line that visualizes a phase difference among the six light signals, and connects locations of the six light signals on a waveguide in which the phases of the six light signals are the same. As illustrated in FIG. 3A, a light signal passed through a third waveguide has a greatest distance between the phase front 320 and the z axis 310 among the six light signals, and thus a phase error of the light signal may be the greatest among the light signals. Similarly, a phase error of a light signal passed through a first waveguide may be the smallest among the light signals.

FIG. 3B is a graph 330 illustrating phase errors measured from the z axis 310. "Δϕ(k)" (or "$Δϕ_k$" as illustrated in FIG. 3B) indicates a phase error of a light signal passed through a k-th waveguide. Referring to FIG. 3B, "Δϕ(1)" indicates a smallest value, and "Δϕ(3)" indicates a greatest value. According to an example embodiment, a length of the k-th waveguide of the phase error compensating apparatus may be adjusted based on Δϕ(k).

Figure 4A:
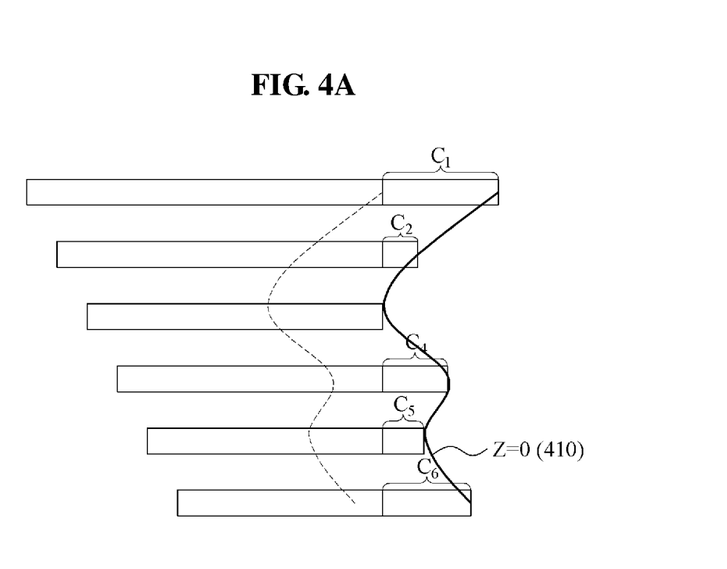
FIGS. 4A and 4B are diagrams illustrating a length of each waveguide included in a waveguide array subsequent to compensation for a phase error illustrated in FIGS. 3A and 3B according to an example embodiment.
Figure 4B:
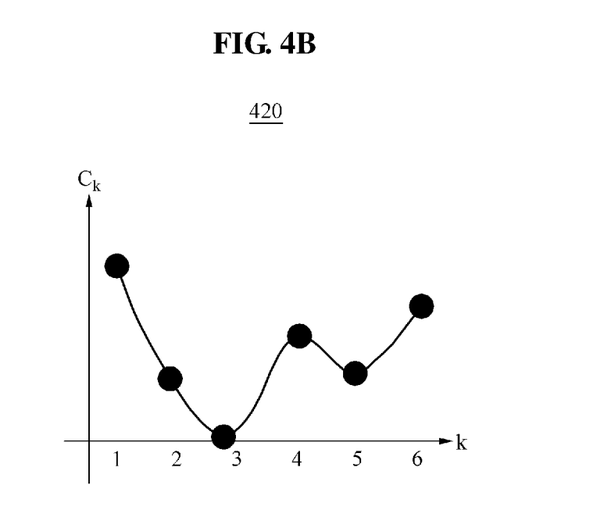

FIGS. 4A and 4B are diagrams illustrating a length of each waveguide included in a waveguide array subsequent to compensation for the phase error illustrated in FIGS. 3A and 3B according to an example embodiment. According to an example embodiment, a length of a k-th waveguide of the phase error compensating apparatus may be determined by adding, to L(k), a length c(k) to compensate for a phase error. Thus, a final length L'(k) of the k-th waveguide of the phase error compensating apparatus may be defined by Equation 1 below.

$$L'(k)=L(k)+c(k) \quad \quad \text{[Equation 1]}$$

When the c(k) of the phase error compensating apparatus is adjusted, phases of respective light signals passed through waveguides included in the waveguide array may correspond to a designed value at an end portion of the waveguide array. Referring to FIG. 4A, the phase error compensating apparatus may add the c(k) to the L(k) to match a phase front 410 to the end portion of the waveguide array. Thus, the phases of the light signals passed through the waveguides may correspond to the designed value at the end portion of the waveguide array. Thus, a loss of a light signal, a crosstalk, and the like due to a phase error may be reduced.

According to an example embodiment, the c(k) may be determined based on a phase of a waveguide corresponding to a light signal having a greatest phase error among the light signals passed through the waveguides included in the waveguide array. Referring to FIG. 4A, the c(k) may be adjusted based on a phase of a third waveguide having a greatest phase error. Thus, a length of a waveguide to be added for compensating for the phase error may be minimized.

FIG. 4B is a graph 420 illustrating the c(k) ($C_k$ as illustrated in FIG. 4B). Referring to FIG. 4B, c(3) corresponding to the third waveguide having the greatest phase error may be 0, because the respective lengths of the waveguides included in the waveguide array are adjusted based on a phase of a waveguide corresponding to a light signal having a greatest phase error. Similarly, c(1) corresponding to a first waveguide having a smallest phase error may be a greatest value.

According to an example embodiment, the length c(k) for compensating for a phase error of the phase error compensating apparatus may be determined based on Δϕ(k). In detail, the c(k) may be determined based on Equation 2 below.

$$c(k) = -\left(\frac{\Delta\varphi(k)}{2\pi} + m_k\right)\frac{\lambda}{n_{eff}} + \alpha \quad \text{[Equation 2]}$$

In Equation 2, "α" denotes a real number, and may be set to be consistent with respect to all the waveguides included in the waveguide array. "$n_{eff}$" denotes an effective refractive index of the k-th waveguide, and "λ" denotes a wavelength of the light signal passing through the k-th waveguide. In AWG, the center wavelength may be used for "λ". "$m_k$" denotes an integer that is arbitrarily selected.

Referring to Equations 1 and 2, the final length L'(k) of the k-th waveguide of the phase error compensating apparatus may be determined based on Equation 3 below.

$$L'(k) = L(k) - \left(\frac{\Delta\varphi(k)}{2\pi} + m_k\right)\frac{\lambda}{n_{eff}} + \alpha \quad \text{[Equation 3]}$$

An arrayed waveguide grating (AWG) be embodied in various forms. For example, the AWG may be provided as a box type, a flat type, and a horseshoe type. Hereinafter, based on a horseshoe type AWG, an example of adjusting a length of each waveguide included in a waveguide array of a phase error compensating apparatus will be described.

Figure 5A:
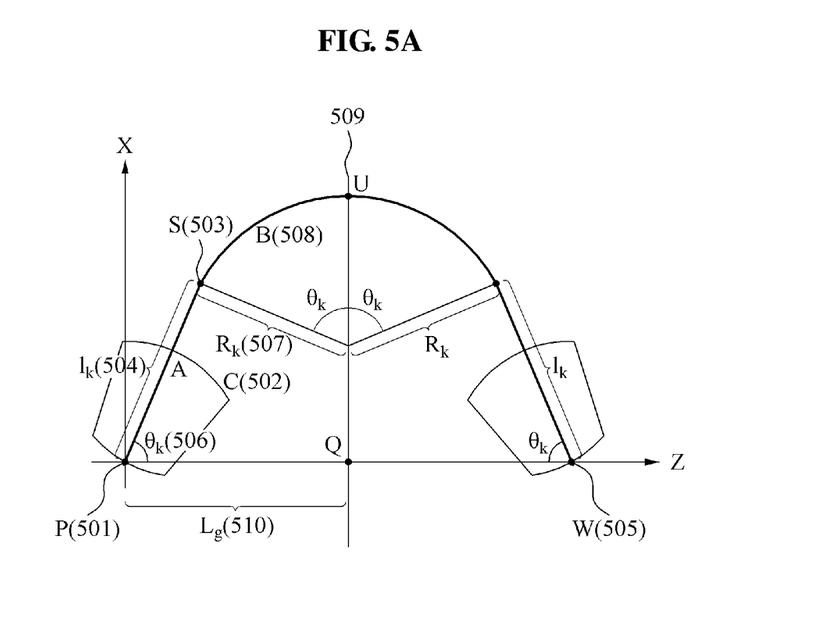
FIGS. 5A and 5B are diagrams illustrating a configuration of a phase error compensating apparatus according to an example embodiment.

FIGS. 5A and 5B are diagrams illustrating a configuration of a phase error compensating apparatus according to an example embodiment. Referring to FIG. 5A, a point P 501 indicates a central point of a circular arc C 502, which is a boundary between a first free propagation region and a waveguide array. A light signal input through an input waveguide may be propagated from the point P 501.

According to an example embodiment, a waveguide array of a phase error compensating apparatus based on a horseshoe type AWG may be divided into a straight portion in which a plurality of waveguides included in the waveguide is straightly formed, and a circular arc-shaped portion in which the waveguides are formed to be a circular arc shape. Referring to FIG. 5A, a point S 503 indicates a boundary between a straight portion and a circular arc-shaped portion of a k-th waveguide included in the waveguide array. $l_k$ 504 indicates a length of a line connecting the point P 501 and the point S 503, and a length of the straight portion of the k-th waveguide may be a value obtained by subtracting a radius of the circular arc C 502 from the $l_k$ 504.

As illustrated in FIG. 5A, $\theta_k$ 506 indicates an angle formed between the line connecting the point P 501 and the point S 503 and an z axis, and a line connecting the point P 501 and a point W 505 and the z axis, respectively. $R_k$ 507 indicates a radius of the circular arc-shaped potion of the k-th waveguide. A central angle of a circular arc B 508 of the circular arc-shaped portion of the k-th waveguide may be designed to be the $\theta_k$ 506. A point Q indicates a central point of the line connecting the point P 501 and the point W 505, and a line 509 connecting the point Q and a point U may be a symmetry axis of the waveguide array. $L_g$ 510 indicates a length of a line connecting the point P 501 and the point Q. The point W 505 indicates a point corresponding to the point P 501 in a second free propagation region.

According to an example embodiment, the length of the straight portion or the radius of the circular arc-shaped portion of the k-th waveguide of the phase error compensating apparatus may be adjusted, and thus a phase error may be compensated for. In detail, the length of the straight portion or the radius of the circular arc-shaped portion of the k-th waveguide may be adjusted based on a central angle of the circular arc-shaped portion of the k-th waveguide.

The phase error compensating apparatus may be symmetrical based on the line 509 connecting the point Q and the point U. When a length of a light path with respect to an entirety of the first free propagation region, the waveguide array, and the second free propagation region of a light signal passed through the k-th waveguide is La(k), La(k) may be represented by Equation 4 using the symmetry described above.

$$\frac{La(k)}{2} = l_k + R_k\theta_k \quad \text{[Equation 4]}$$

Figure 5B:
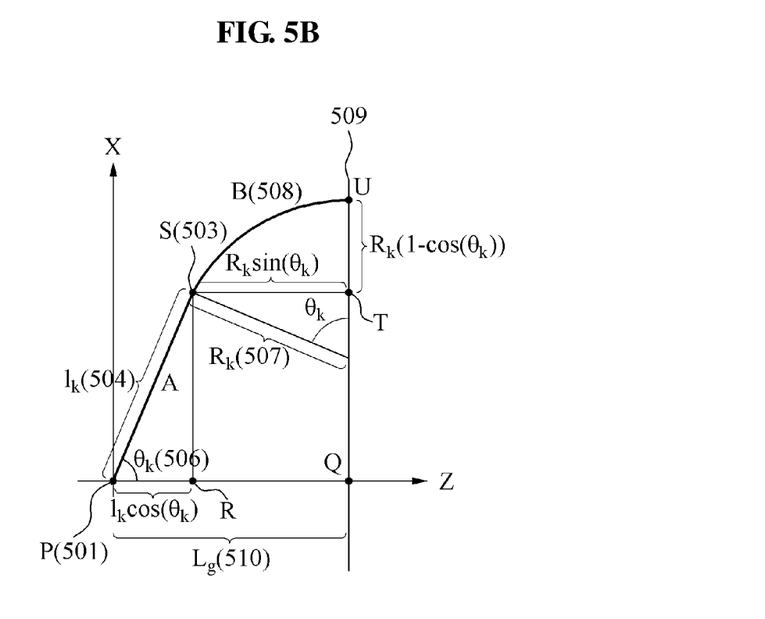

Referring to FIG. 5B, a relationship represented by Equation 5 may be established between $R_k$ 507 and $l_k$ 504.

$$R_k = \frac{[L_g - l_k \cos \theta_k]}{\sin \theta_k} \quad \text{[Equation 5]}$$

Equation 6 below may be obtained by substituting Equation 5 to Equation 4.

$$\frac{La(k)}{2} = l_k + \frac{[L_g - l_k \cos \theta_k]\theta_k}{\sin \theta_k} \quad \text{[Equation 6]}$$
$$= l_k(1 - \theta_k \cot \theta_k) + L_g\frac{\theta_k}{\sin \theta_k}$$

Referring to Equation 6, La(k) may be linearly proportional to $l_k$ 504. In addition, La(k) may be determined by the central angle $\theta_k$ 506 of the circular arc-shaped portion of the k-th waveguide. According to an example embodiment, a length of a straight portion of each of the waveguides of the phase error compensating apparatus may be adjusted, and thus a phase error may be compensated for. In detail, when a variation in the length of the straight portion of the k-th waveguide is $\delta(k)$ and a final adjusted length of the straight portion of the k-th waveguide for the compensation for a phase error is La'(k), a relationship between $\delta(k)$ and La'(k) may be represented by Equation 7 below using the c(k).

$$\frac{La'(k)}{2} = \frac{La(k) + c(k)}{2} \quad [\text{Equation 7}]$$
$$= (l_k + \delta_k)(1 - \theta_k \cot \theta_k) + L_g \frac{\theta_k}{\sin \theta_k}$$

A relationship between the c(k) and the $\delta(k)$ as represented by Equation 8 below may be derived by eliminating the La(k) from Equations 6 and 7.

$$\delta(k) = \frac{c(k)}{2(1 - \theta_k \cot \theta_k)} \quad [\text{Equation 8}]$$

Referring to Equation 8, the length of the straight portion of the k-th waveguide of the phase error compensating apparatus may be adjusted based on the c(k) and the $\theta_k$ 506 in Equation 2.

According to an example embodiment, a radius of a circular arc-shaped portion of each waveguide included in the waveguide array of the phase error compensating apparatus may be adjusted, and thus a phase error may be compensated for. Here, it may be assumed that the $L_g$ 510 and the $\theta_k$ 506 are the same before and after the adjustment of lengths of the waveguides included in the waveguide array to compensate for a phase error. Under such an assumption, when a variation of a radius $R_k$ 507 of the circular arc-shaped portion of the k-th waveguide is $\epsilon(k)$, Equation 5 may be converted to Equation 9 below.

$$R_k + \varepsilon(k) = \frac{[L_g - (l_k + \delta(k))\cos \theta_k]}{\sin \theta_k} \quad [\text{Equation 9}]$$

From Equations 5 and 9, a relationship between the $\epsilon(k)$ and the c(k) may be derived as represented by Equation 10 below.

$$\varepsilon(k) = -\delta(k) \cot \theta_k = -\frac{c(k)}{2(\tan \theta_k - \theta_k)} \quad [\text{Equation 10}]$$

Referring to Equation 10, the radius of the circular arc-shaped portion of the k-th waveguide of the phase error compensating apparatus may be adjusted based on the c(k) and the $\theta_k$ 506 in Equation 2.

Figure 6A:
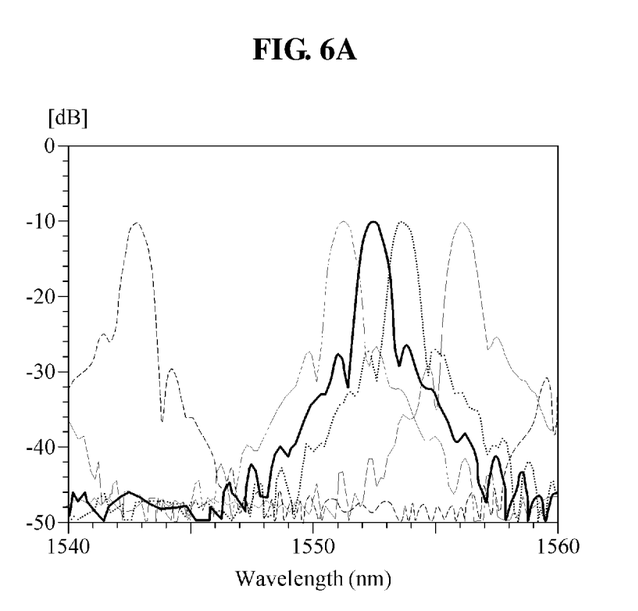
FIGS. 6A and 6B are diagrams illustrating spectrums of light signals output from, respectively, an existing arrayed waveguide grating (AWG) and a phase error compensating apparatus according to an example embodiment.
Figure 6B:
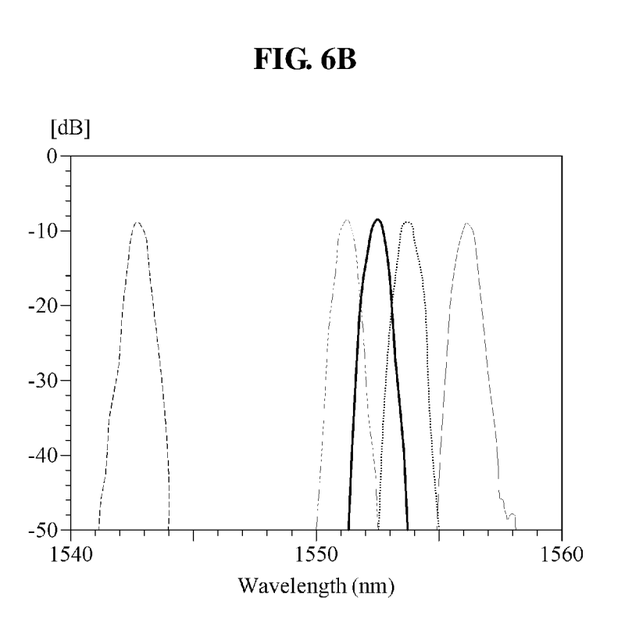

FIGS. 6A and 6B are diagrams illustrating spectrums of light signals output from, respectively, an existing AWG and a phase error compensating apparatus according to an example embodiment. Referring to FIGS. 6A and 6B, the existing AWG and the phase error compensating apparatus described herein may demultiplex a plurality of light signals having different wavelengths being between 1540 nanometers (nm) and 1560 nm.

Referring to FIG. 6A, a crosstalk among a plurality of demultiplexed light signals to be output from the existing AWG may be greater than or equal to −18 decibels (dB). Referring to FIG. 6B, in comparison to the existing AWG, a crosstalk among a plurality of light signals to be output from an AWG to which the phase error compensating apparatus is applied may be less than or equal to −20 dB, or less than or equal to −30 dB for some light signals. That is, the phase error compensating apparatus may compensate for a phase error of the light signals, and thus the crosstalk in the phase error compensating apparatus may be improved compared to the crosstalk in the existing AWG.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A phase error compensating apparatus, comprising:
an input waveguide corresponding to an input port to which a light signal is to be input;
an output waveguide corresponding to an output port from which a light signal is to be output;
a first free propagation region in which the light signal input through the input waveguide is to be propagated;
a second free propagation region in which a light signal is to be propagated toward the output waveguide; and
a waveguide array comprising waveguides, disposed between the first free propagation region and the second free propagation region, and configured to allow a light signal passed through the first free propagation region to move toward the second free propagation region,
wherein lengths of the waveguides are adjusted to compensate for a phase error of light signals passed through the waveguides, and
wherein a length of a waveguide among the waveguides is adjusted based on a phase error of a light signal passed through the waveguide, a center wavelength of a light signal passed through the waveguide array, and an effective refractive index of the waveguide.

2. The apparatus of claim 1, wherein the waveguide array comprises a straight portion in which the waveguides are formed to be straight and a circular arc-shaped portion in which the waveguides are formed to be in a circular arc shape.

3. The apparatus of claim 2, wherein a length of the straight portion is adjusted based on a central angle of the circular arc-shaped portion.

4. The apparatus of claim 2, wherein a radius of the circular arc-shaped portion is adjusted based on a central angle of the circular arc-shaped portion and a length of the straight portion.

5. The apparatus of claim 1, wherein a length of each of the waveguides is adjusted based on a phase of a waveguide corresponding to a light signal having a greatest phase error among the light signals passed through the waveguides.

6. A phase error compensating apparatus, comprising:
- an input waveguide corresponding to an input port to which a light signal is to be input;
- an output waveguide corresponding to an output port from which a light signal is to be output;
- a first free propagation region in which a light signal input through the input waveguide is to be propagated;
- a second free propagation region in which a light signal is to be propagated toward the output waveguide; and
- a waveguide array comprising waveguides, disposed between the first free propagation region and the second free propagation region, and configured to allow the light signal passed through the first free propagation region to move toward the second free propagation region,
- wherein lengths of the waveguides are adjusted to compensate for a phase error of light signals passed through the waveguides, and
- wherein a length of each of the waveguides is adjusted based on a phase of a waveguide corresponding to a light signal having a greatest phase error among the light signals passed through the waveguides.

* * * * *